United States Patent
Kwan

(10) Patent No.: US 8,033,468 B2
(45) Date of Patent: Oct. 11, 2011

(54) APPARATUS, METHOD AND SYSTEM FOR AN IMAGE SCANNER WITH DIFFERENTIAL PANNING

(75) Inventor: Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 455 days.

(21) Appl. No.: 12/176,778

(22) Filed: Jul. 21, 2008

(65) Prior Publication Data

US 2010/0012727 A1 Jan. 21, 2010

(51) Int. Cl.
*G06K 7/10* (2006.01)
(52) U.S. Cl. .......... 235/462.01; 235/462.25; 235/462.36
(58) Field of Classification Search .............. 235/462.01, 235/462.25, 462.36, 375, 462.24
See application file for complete search history.

(56) References Cited

U.S. PATENT DOCUMENTS

| | | | | |
|---|---|---|---|---|
| 6,034,379 A | * | 3/2000 | Bunte et al. | 250/566 |
| 6,688,525 B1 | * | 2/2004 | Nelson et al. | 235/462.21 |
| 6,843,416 B2 | * | 1/2005 | Swartz et al. | 235/454 |
| 7,705,337 B2 | * | 4/2010 | Gibson | 250/559.06 |

* cited by examiner

*Primary Examiner* — Edwyn Labaze
(74) *Attorney, Agent, or Firm* — Harden E. Stevens, III

(57) ABSTRACT

An image scanner apparatus, method and system to scan a bar code or other optical code using an image capture device where the blurring associated with the movement of the bar code pass the image scanner is reduced or eliminated by using differential panning of the bar code. An image of the bar code is panned or moved across the image capture device in a direction that negates at least some of the apparent movement of the bar code past the image scanner. The apparent motion of the bar code to the image capture device is reduced thus reducing the blurring of the bar code in the captured image.

14 Claims, 3 Drawing Sheets

APPARATUS, METHOD AND SYSTEM FOR AN IMAGE SCANNER WITH DIFFERENTIAL PANNING

TECHNICAL FIELD

An apparatus, method and system described herein relates generally to improvements to a imaging bar code scanner. More particularly, the invention relates to improving the success for reading optical codes on the first pass by the imaging bar code scanner when the optical code has a high passby speed.

BACKGROUND

Bar code scanners are used in a wide variety of applications that rely on bar codes to store information. Industries such as retail, airline, self-service, automotive, parcel delivery, pharmaceutical, healthcare and others use optical codes to provide inventory control, customer identification, item tracking, security and many other functions. A bar code is read or scanned by a bar code scanner. The bar code is attached to or printed on an object and contains information about or related to the object. A typical bar code is comprised of a number of bars separated by spaces. Information is encoded on a bar code by varying the width of the bars and spaces. When a bar code is placed within the field of view of a bar code scanner, the scanner will detect, analyze and decode the bars and spaces comprising the bar code to retrieve the information encoded in the bar code. This operation is also called scanning or reading a bar code. The information encoded on a bar code is usually a sequence of numeric or alphanumeric numbers e.g., a Universal Product Code (UPC) or European Article Number (EAN).

An imaging bar code scanner (also referred to as an image scanner) reads a bar code by capturing a digital image of the bar code and then processing the image to detect and decode the bar code. It is advantageous for the bar code scanner to successfully read all bar codes presented to the scanner on the bar codes first pass by the scanner. This is known as a successful first pass read. Successful first pass reads of bar codes helps to maintain a good workflow at the checkout station and speeds up the overall checkout process. A high first pass read success rate has also been found to reduce stress on the person operating the scanner. This is particularly true if the operator is a customer operating a self-checkout terminal.

The percentage of successful first pass reads for an imaging scanner is negatively affected as the bar code passby speed increases. As the passby speed of a bar code increases, the image of the bar code captured by the image scanner starts to blur. The blurring reduces the ability of the image scanner to accurately detect and decode the bar code thus reducing the number of successful first pass reads. Because of external factors such as bar code size, bar code fidelity, illumination and bar code orientation to the scanner, the maximum passby speed for a successful first pass read will vary greatly. Since these and other factors are outside the control of the image scanner, it is important to reduce blurring as much as possible using methods that are controlled by the image scanner in order to achieve a high first pass read of a bar code.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Figure 1:
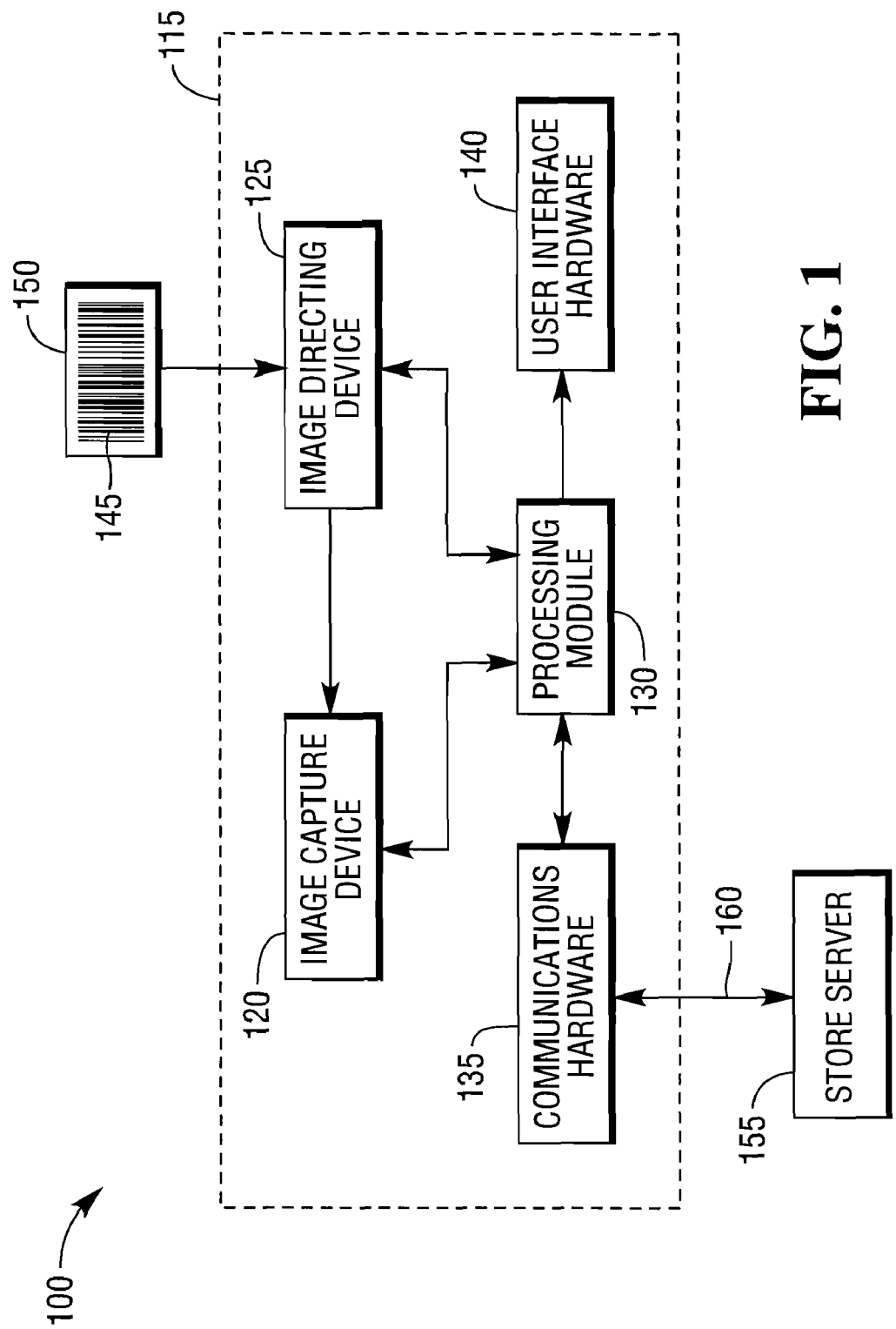
FIG. 1 is a block diagram illustration of an embodiment of an image scanning system.

Referring now to FIG. 1, there is provided a high level illustration, in block form, of an embodiment of an image scanning system 100, which is used to read a bar code 145. The image scanning system 100 comprises an image scanner 115, a store server 155 and a bar code 145 printed on a label 150. The label 150 is affixed to an item or product (not shown). In some embodiments, the bar code 145 is printed, applied or manufactured directly onto the item or product. The image scanner 115 communicates with the store server 155 over a computer data network 160. The network 160 can be a wired network (e.g., an Ethernet network) or wireless network (e.g., an IEEE 802.11G based network) or a combination of both types networks. In some embodiments, the store server 155 is physically removed from the store where the image scanner 115 is located and communicates with the image scanner 115 over the Internet or a wide area network or a combination of these or different types of networks. In some embodiments, multiple image scanners 115 are part of the image scanning system 100 and communicate over the data network 160 to the store server 155.

The image scanner 115 is capable of reading a number of different types of optical codes. In this embodiment, the optical code is a one dimensional (1D) bar code 145. In other embodiments, the optical codes read by the image scanner 115 includes a two dimensional (2D) bar code and bar codes that have non-standard sizes. In still other embodiments, the image scanner can read optical codes being displayed on an electronic display such as a personal digital assistant (PDA) or cell phone.

The image scanner 115 includes an image directing device 125 that receives an optical image and directs the image onto an image capture device 120. The image scanner 115 further comprises a processing module 130, user interface hardware 140, and communications hardware 135. The processing module 130 comprises at least one processor, memory, stored instructions and control and interface hardware used to control the other devices and modules of the image scanner 115. The processing module 130, by executing stored instructions, controls the hardware devices and modules that comprise the image scanner 115. In addition, the stored instructions cause the processor to: process data such as an image that is captured by the image capture device 120, identify and decode a bar code from the captured image, control the communications hardware 135 to implement protocols used on the data network 160, control the image directing device 125, control the image capture device 120 and implement other software features and functions of the image scanner 115. In some cases, the store server 155 sends the image scanner 115 updates to the stored instructions or to the operating parameters of the image scanner 115. In some embodiments, updates to the stored instructions are made directly to the image scanner 115 using portable memory storage devices that can communicate directly (e.g., by direct connection or wirelessly) to the image scanner 115. Once received, the updates are stored in the image scanner 15.

Figure 2:
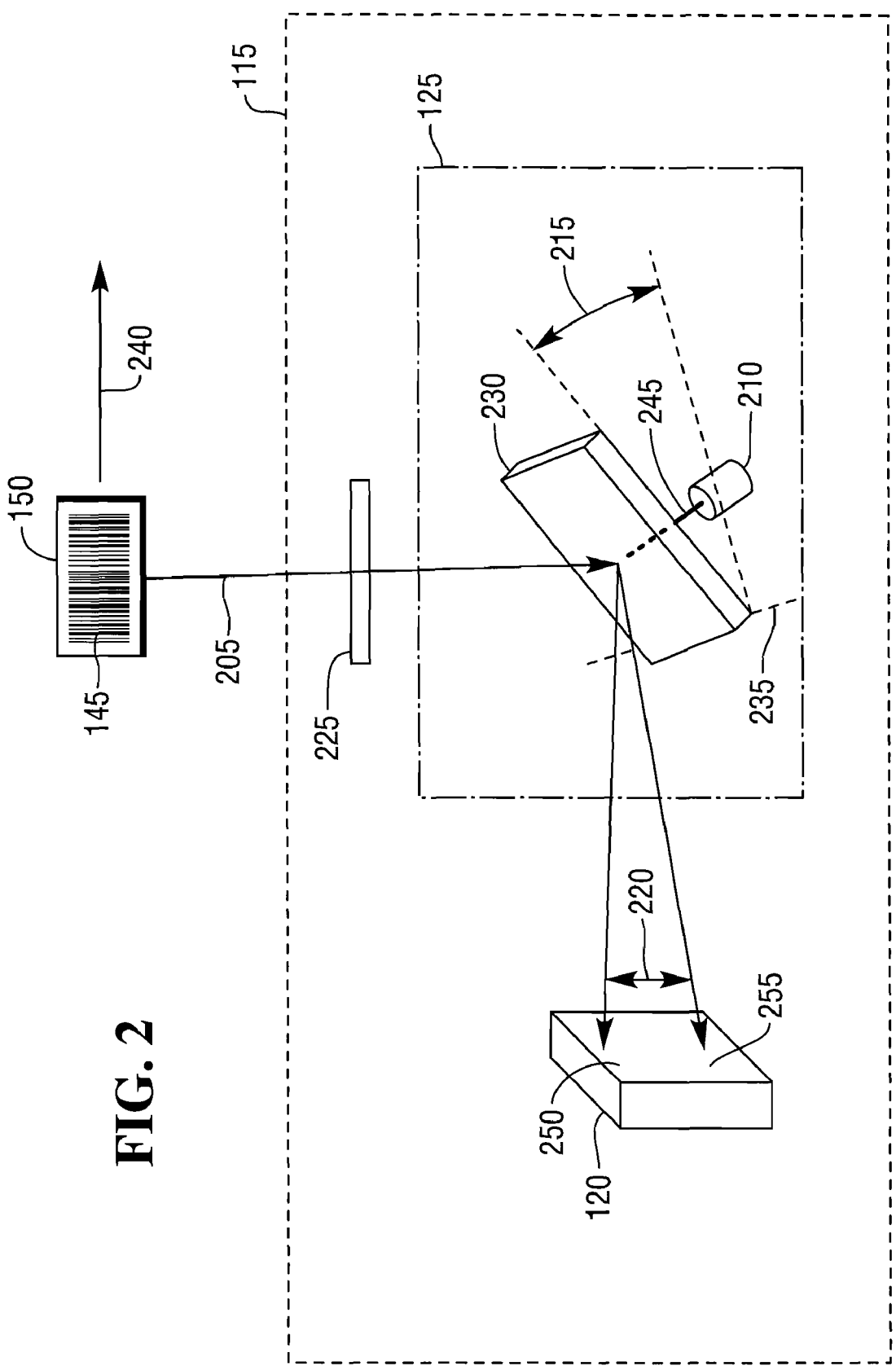
FIG. 2 is an illustration of an embodiment of the image directing device.

FIG. 2 is a detailed illustration of a portion of the image scanner 115. In this illustration, an optical image of the bar code 145 enters the image scanner 115 along optical image path 205. The image passes through optics 225 that are designed to properly focus the image on the image capture device 120 (once the image has been directed there by the image directing device 125). The image then passes to the image directing device 125 and is directed to the image capture device 120 where the optical image is captured by converting it to an electronic image. In addition to simple directing an image to the image capture device 120, the image directing device 125 can, when instructed to by the processor, cause the image to move or pan across the surface of the image capture device 120. The movement or panning of the image is independent of any movement of an object that appears in the image.

The image directing device 125 comprises a reflecting device 230 that is responsible for directing the incoming optical image to the surface of the image capture device 120. The reflective device 230 can move the image focused on the image capture device 120 through a range of locations 220. This is accomplished by tilting the reflective device 230 about an axis 235 through all or part of a range of motion 215. An actuator 210, connected to the reflective device 230, is used to move the reflective device 230 through its range of motion 215. In this embodiment, the actuator 210 extends or retracts an arm 245 to move the reflective device 230 through it range of motion 215. The processor module 130, through its interface to the actuator 210 controls the speed at which the arm 245 is extended or retracted. Adjusting the speed of the actuator 210, controls the angular velocity of the reflecting device 230, which controls the panning speed of the image as it moves across the image capture device 120. When the processor modules 130 determines that the image is being moving at the correct speed across the image capture device 120 and that the image 205 is properly located on the surface of the image capture device 120, the processor module 130 causes the image capture device 120 to capture an image. Because of the mass of the reflective device 230, the delays in the actuator 210 and the desired angular velocity, the processor module 130 must wait for the reflective device 230 to obtain the desired angular velocity before causing the image capture device 120 to capture the image. While the image directing device 125 can pan an image across the image capture device 120, it can also remain in a fixed position and still direct the image to the image capture device 120.

By panning an image across the image capture device 120, the apparent velocity of an object moving past the image scanner 115 relative to the image capture device 120 can be altered. If a bar code 145 is moving in direction 240, the reflected image of the bar code would moved from the bottom 255 to the top 250 of the image capture device 120 (assuming the image directing device 125 remains fixed). If the actuator 210 moves from an extended position to a retracted position, the entire reflected image will be panned from the bottom 255 to the top 250 of the image capture device 120 thus countering some or all of the movement of the reflected bar code in the directed image. Reducing the relative motion of the reflected bar code image to the image capture device 120 results in the capture of an image where the blurring of the bar code caused by the movement of the bar code pass the image scanner 115 has been reduced or eliminated. Reducing or eliminating bar code burring increases the ability to read the moving bar code and increases the percentage of good first pass reads for bar codes that are moving past the image scanner.

The image scanner 115 can be operated in a mode where the image directing device 125 is fixed and does not pan the incoming image. It can also operate in a panning mode where the incoming image is panned across the image capture device 120. In some embodiments, it operates in a hybrid mode where it uses a fix first scan followed by a second panning scan. The processor module 130 can also vary the speed of the actuator 210 to better match the speed of the bar code 145 as the bar code 145 moves by the image scanner 115. The image scanner 115 takes multiple images of the bar code 145 as it passes by the image scanner 115. In some cases, the retraction or extension speed of the actuator 210 is changed during the same cycle of the actuator 210. The processor module 130 may start the actuator 210 moving at one speed and then change the speed all before the actuator reaches its travel limit. During this time, the processor module 130 causes the image capture device 120 to capture multiple images.

In some embodiments, the image scanner will keep statistics regarding the average speed of a bar code presented to the image scanner for reading. The image scanner records the image panning speed needed to get a good read of the bar code and averages the speed with other good reads of a bar code. In some cases, the image scanner will determine the level of blurring for the captured bar code image and adjust the panning speed to reduce the blurring and include the adjusted speed in the average. This allows the image scanner to adjust quickly to individual users.

The present embodiment describes a single axis image directing device 125. In other embodiments, the image directing device 125 has a second axis of rotation that is used in combination with the first axis to allow panning of the image in two dimensions across the image capture device 120. A second actuator is used to move the image reflecting device 230 through a range of motion for the second axis of rotation.

Figure 3:
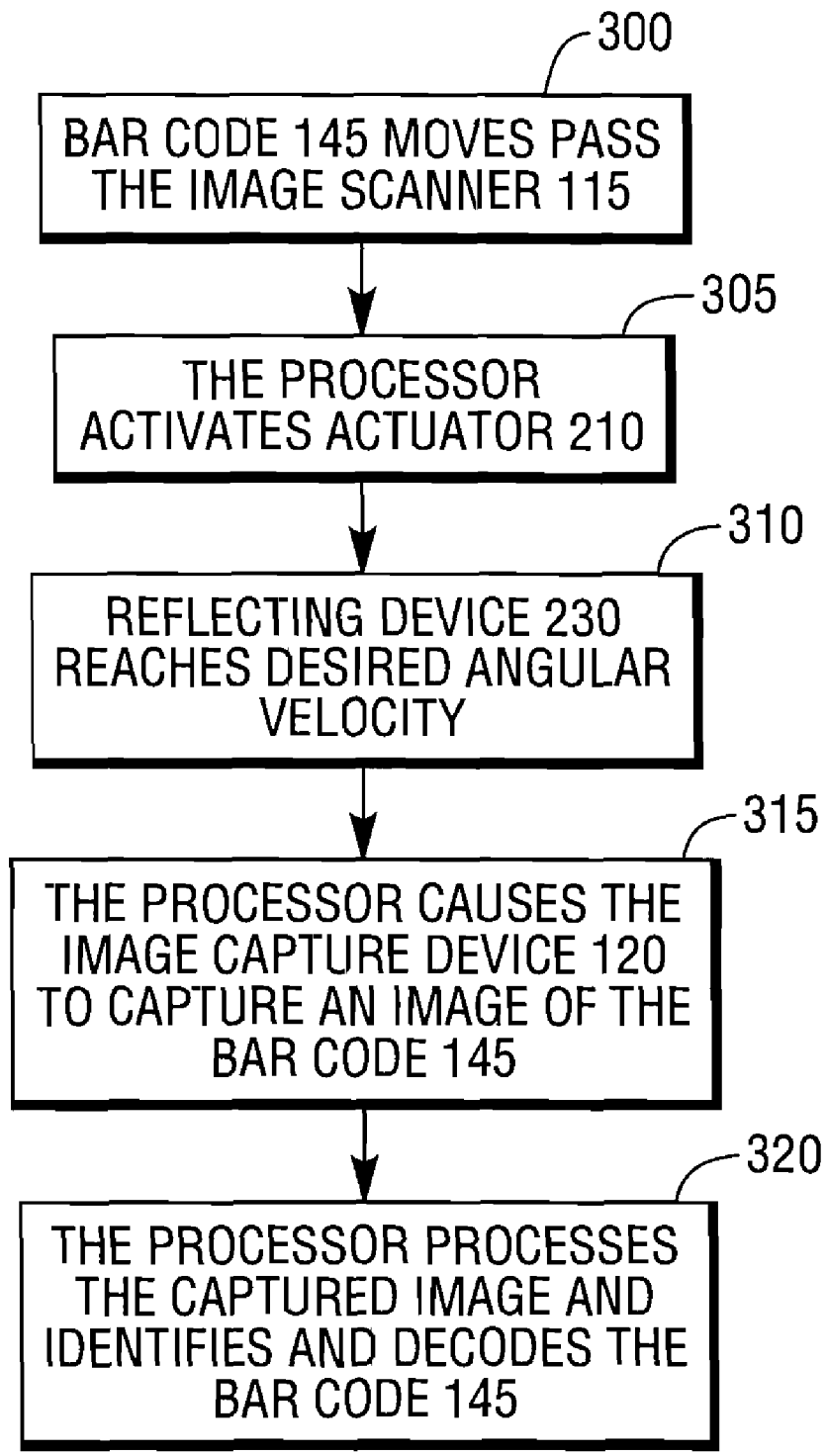
FIG. 3 is a high level flow diagram of an embodiment of the present invention.

Turning now to FIG. 3, there is presented a high level flow diagram for a function of an embodiment of the present invention in which a bar code 145 is read by the image scanner 115. In step 300, a bar code 145 is moved past the image scanner 115. The processor in the processor module 130 executes stored instructions that cause the actuator 210 to move, which causes the reflecting device 230 to rotate 310. After a short period of time, the reflecting device 230 reaches a desired angular velocity 310 determined by the processor when it activated the actuator 210. The processor causes the image capture device 120 to capture an electronic image of the reflected image containing the bar code 315, when the image is being panned across the image capture device 120. The processor processes the captured image to identify and decode the bar code 145.

In other embodiments, the image directing device 125 uses a micro-electro-mechanical system (MEMS) of mirrors to direct the incoming image to the image capture device 120. The MEMS mirror comprises a number of small mirrors that can be rotated together or individually. By controlling the rotation of the mirrors, a image reflected off the mirrors can be moved or panned across the image capture device 120.

In some embodiments, the image scanner 110 is designed to read additional types of optical codes other than bar codes. These optical codes include text, numbers, symbols and images.

In still other embodiments, the image scanner 110 captures an image of an object and identifies the object in the image. The object can be a box, car, truck, train car or anything that would move past the image scanner 110 and require identification. Reducing the blurring caused by the motion of the object past the image scanner 110, increases the ability to accurately identify the object.

While the invention is disclosed in the context of an image bar code scanning embodiment, it will be recognized that a wide variety of implementations may be employed by a person of ordinary skill in the art consistent with the above discussion and the claims, which follow below.

What is claimed is:

1. An optical code image scanner apparatus for scanning an optical code where blurring associated with the movement of the optical code is reduced, the apparatus comprising:
   an image capture device to capture an image comprising the optical code;
   an image directing device comprising:
      a movable image reflecting device to pan a directed image across the image capture device;
      an actuator that moves the image reflecting device at a speed that is controllable; and
      where the image directing device reduces the apparent motion of the optical code relative to the image capture device by panning a directed image of the optical code across the image capture device as the image capture device captures an image of the optical code; and
   a processor adapted to control the image directing device and the image capture device where the processor causes the reflected image to move at a first speed and then causes the image capture device to capture a first image of the optical code when the image is panning across the image capture device and where the processor causes the reflected image to move at a second speed and then causes the image capture device to capture a second image of the optical code when the image is panning across the image capture device.

2. The apparatus of claim 1, where the image reflecting device is rotated about a single axis.

3. The apparatus of claim 1, where the image reflecting device is rotatable about two axis.

4. The apparatus of claim 1, where the image directing device comprises a MEMS minor.

5. The apparatus of claim 1, where the optical code is a bar code.

6. A computer implemented method of scanning an optical code by an optical code image scanner wherein blurring associated with the movement of the optical code past the scanner is reduced, the method comprising:
   receiving an optical image of the optical code;
   directing the optical image of the optical code using an image directing device to an image capture device where the image directing device causes the image to move across the image capture device at a first speed to reduce the apparent motion of the optical code in the image relative to the image capture device; and
   using the image capture device, capturing an electronic image of the optical code when the image of the optical code reaches the first speed and as it moves across the image capture device.

7. The method of claim 6, wherein directing the image using an image directing device further comprises causing the image directing device to move the image across the image capture device at a second speed and where capturing an electronic image of the optical code further comprises causing the image capture device to capture the electronic image of the optical code when the image of the optical code has reached the second speed moving across the image capture device.

8. The method of claim 7, further comprising determining the level of optical code burring in the captured electronic image for each of the first and second speeds and using the results to select the next first speed.

9. The method of claim 6, where the optical code is a bar code.

10. An image scanning system for scanning an optical code where blurring associated with the movement of the optical code is reduced, the system comprising:
    a store server computer;
    a network connected to the store server computer; and
    an optical code image scanner connected to the network, the optical code image scanner comprises:
       an image capture device to capture an image of the optical code; and
       an image directing device comprising:
          a movable image reflecting device to pan a directed image across the image capture device;
          an actuator that moves the image reflecting device at a speed that is controllable; and
          where the image directing device reduces the apparent motion of the optical code relative to the image capture device by panning a directed image of the optical code across the image capture device as the image capture device captures an image of the optical code; and
       a processor adapted to control the image directing device and the image capture device where the processor causes the reflected image to move at a first speed and then causes the image capture device to capture a first image of the optical code when the image is panning across the image capture device and where the processor causes the reflected image to move at a second speed and then causes the image capture device to capture a second image of the optical code when the image is panning across the image capture device.

11. The system of claim 10, where the image reflecting device is rotated about a single axis.

12. The system of claim 10, where the image reflecting device is rotatable about two axis.

13. The system of claim 10, where the image directing device comprises a MEMS minor.

14. The system of claim 10, where the optical code is a bar code.

* * * * *